Aug. 3, 1937.    F. BECK    2,089,106
MOVING PICTURE CAMERA
Filed Nov. 3, 1934    2 Sheets-Sheet 1
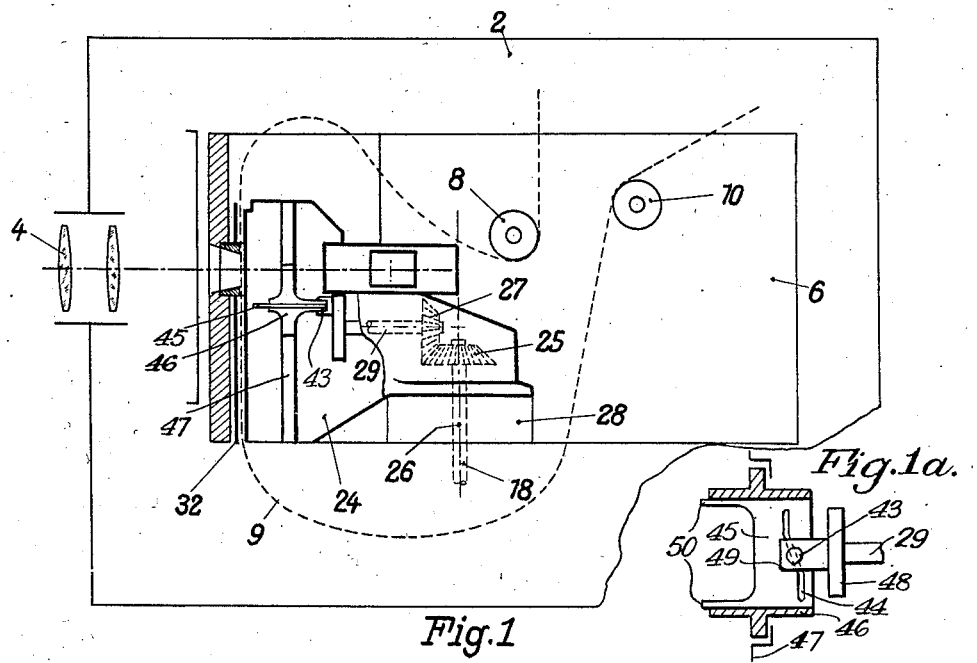
Fig.1
Fig.1a.
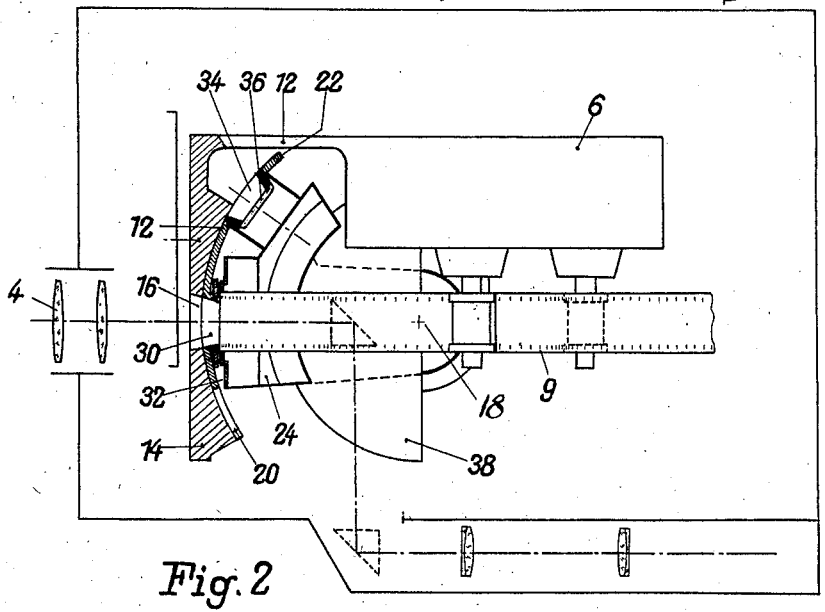
Fig.2
Inventor:
F. Beck
by E. H. Palmer
His atty.

Aug. 3, 1937.   F. BECK   2,089,106
MOVING PICTURE CAMERA
Filed Nov. 3, 1934   2 Sheets-Sheet 2

Inventor:
F. Beck
by E. H. Palmer
His atty.

Patented Aug. 3, 1937

2,089,106

UNITED STATES PATENT OFFICE 2,089,106

MOVING PICTURE CAMERA

Friedrich Beck, Berlin-Steglitz, Germany, assignor to Askania-Werke A. G. vormals Central-Werkstatt Dessau und Carl Bamberg-Friedenau, a German company Application November 3, 1934, Serial No. 751,408
In Germany November 4, 1933

3 Claims. (Cl. 88—16)

This invention relates to moving picture cameras.

One of the objects of the invention is to provide such a camera wherein the film can be moved from its exposure position behind the lens and a ground glass moved into said position, without interrupting the operation of the driving mechanism and without twisting or warping the film, in order to verify if the lens is adjusted to produce a sharp picture or to adjust the lens for that purpose.

Another object of the invention is to provide a moving picture camera wherein the film guiding channel, the ground glass and the feed gearing are combined to form a unit which can be turned as such about the axis of a shaft of the driving mechanism, said shaft being in a plane parallel to that of the film feed.

These and such other aims and objects of the invention as may hereinafter appear, as well as the invention itself, will be readily understood from the following description, taken in connection with the accompanying drawing, of one illustrative embodiment of the invention, the true scope of the invention being more particularly pointed out in the appended claims.

In the drawings:

Fig. 1 is a diagrammatic lateral view with parts in section of one illustrative embodiment of the invention;

Fig. 1a is a top plan view of the film feeding mechanism, the lateral wall of the carriage 24 being broken away.

Fig. 2 is a diagrammatic top view with parts in section of the parts shown in Fig. 1;

Figure 3:
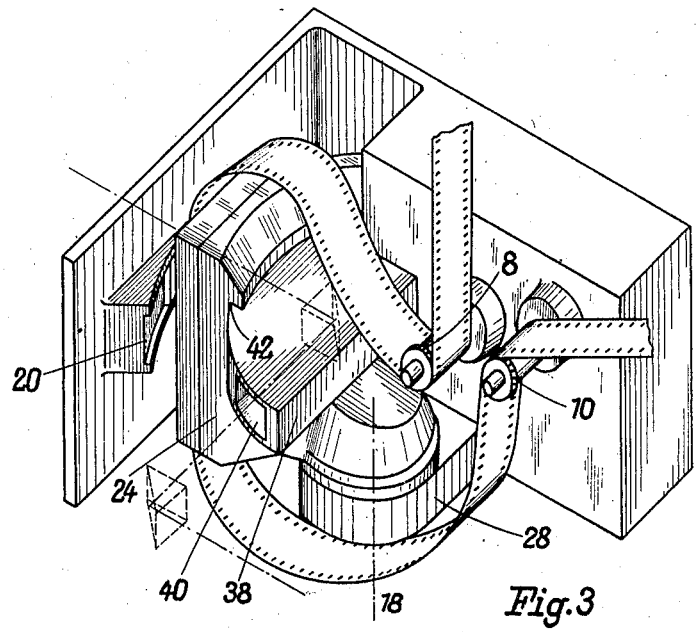
Fig. 3 is a perspective view of said illustrative embodiment of the invention, also largely diagrammatic, with the film in exposure position.

In the illustrative embodiment of the invention shown the camera box or casing is indicated by 2. An adjustable lens 4 is suitably mounted in the front end of said box. The driving mechanism is carried by a frame or supporting member 6 and comprises the two winding rolls 8 and 10, the film 9 passing over said roll 8 before its exposure and over the roll 10 after said exposure. Said frame 6 is provided with a lateral extension 12 supporting a front wall 14 parallel to the front wall of the camera box. In said front wall 14, there is provided an opening 16 which is co-axial with said lens 4. The rear surface of said wall 14 is provided with a horizontal guide slot 20 (Figs. 2 and 3), curved in the arc of a circle having for its center the axis 18 of a vertical drive shaft 26 of the driving mechanism, said shaft being journalled in a horizontal extension 28 of said frame 6.

Said guide slot 20 is engaged by a correspondingly curved rib 22 on the front wall of a carriage 24 which can be turned horizontally about said drive shaft 26. Said drive shaft extends into said carriage and is provided within the latter with a gear 25 which meshes with a gear 27 upon a shaft 29 which serves to drive the film feeding mechanism which is contained within said carriage and may be of any suitable conventional construction. Such a conventional feeding mechanism is disclosed in French Patent No. 780,695 and is that used herein. Said feeding mechanism comprises briefly a crank disk 48 on the free end of shaft 29 and having a crank pin 49 rotatably mounted therein. Said crank pin is recessed to embrace a carriage 45 which is slidable horizontally in a guide 46 which in turn is vertically slidable in a vertical guide 47. At its front edge said carriage 45 is provided with the usual pins 50, 50 to engage the perforations adjacent the two edges of the film, to feed the latter. Said crank pin carries a stud 43 which engages a suitably shaped cam groove 44 provided in said carriage 45.

At each revolution of the shaft 29 the carriage 45 will be moved up and down in said vertical guide 47 and will be reciprocated horizontally in said guide 46, by which combined movements the film will be fed. It will be seen that said carriage can be turned horizontally about said shaft 26 without stopping the driving and feeding mechanism and as said shaft 26 is parallel to the path in which the film is fed, said film will not be twisted or warped, nor will the loop of film between the guide roll 8 or 10 and a feed channel 32 for the film provided in the front wall of said carriage 24 be shortened, when the carriage is thus swung horizontally about said shaft 26, the gear 27 remaining in mesh with the gear 25 during such swinging movement.

Figure 4:
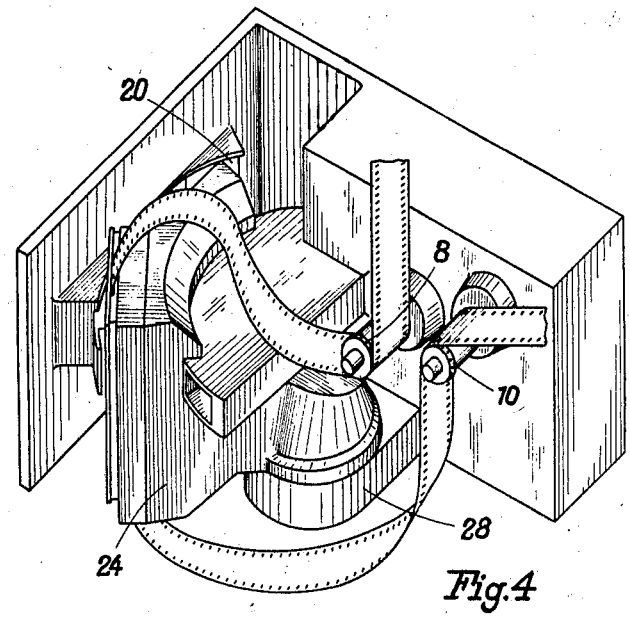
Fig. 4 is a perspective view similar to Fig. 3 with the ground glass shifted to the exposure position of the film.

The front wall of said carriage 24 is provided with an opening 30 over which the film 9 is fed in its vertical feed channel 32 provided in the front wall of said carriage 24. Suitably spaced horizontally from said opening 30 there is provided in the front wall of said carriage a second opening 34 in the same horizontal plane as said opening 30, said opening 34 being closed by a ground glass 36. It will be seen that when said carriage is turned clockwise into the position shown in Figs. 2 and 3, said opening 30 will be brought into coincidence with said opening 16 and the film will be in exposure position, while by turning said carriage contra-clockwise into the position, shown by Fig. 4, said opening 34 and ground glass will be brought opposite said opening 16 and adjustment of the lens can then be verified or rectified. The usual reflecting prisms and magnifying lenses are provided, as shown in Fig. 2 for observing the picture to see that it is sharply projected upon the film or ground glass and for making the necessary adjustment. The drive shaft 26 may be driven from any suitable source of energy.

The prism which is in alignment with said opening 16 may be mounted in a box 38 projecting from said frame 6 and provided with a suitable opening in its front wall in alignment with said opening 16. Another opening 40 is provided in the lateral wall of said box 38, said opening being in alignment with the two prisms. Preferably said carriage 24 will be provided at its rear side with a horizontal slot 42 engaged by the similarly shaped front portion of said box 38, said slot and said front of said box being curved in the arc of a circle having its center in the longitudinal axis of said shaft 26, so that said box will serve as a further guide for said carriage 24 in the latter's turning movement.

So far as applicant is aware he is the first to provide a moving picture camera in which the film can be moved from and the ground glass into exposure position, and vice versa, without interrupting the operation of the driving and feeding mechanism, said turning movement taking place about an axis parallel to the path in which the film is fed, so that the film is not twisted or warped nor is the loop of film shortened as a result of said swinging movement. Focusing to provide at all times a sharply defined picture may thus be effected without the loss of time heretofore entailed by the necessity of arresting the driving mechanism whenever such a focusing operation is carried out. In making sound films the stopping of the driving mechanism is particularly disadvantageous because in addition to stopping the picture film it is also necessary to arrest the sound recording. Also in the case where a synchronous sound record is made simultaneously with the picture as called for when making news reels in particular, it would be apparent that stopping the feed of the picture film is extremely disadvantageous, since in such work the necessity of frequent verification of the sharpness of the picture and the consequent repeated interruption of the operation of the driving mechanism, as heretofore required, entails a very considerable loss of time whereby the recording of extremely important scenes may be entirely lost.

Cameras provided with applicant's invention are particularly well adapted for making sound records, whether the picture and the sound record be made upon the same film or upon separate films. In either case, only the picture-recording will be interrupted for the negligible period of time that the feed continues without exposure while the verification or rectification of the sharpness of the picture is being effected. The slight loss of picture record is insignificant as compared to the great saving in time resulting from the fact that the driving mechanism is not arrested in accordance with the present invention.

I am aware that my present invention may be embodied in other specific forms from that herein described without departing from the spirit or essential attributes thereof, and I therefore desire the present embodiment of said invention to be considered in all respects as illustrative and not restrictive, reference being had to the appended claims rather than to the foregoing description to indicate the scope of the invention.

I claim:

1. A motion picture camera comprising, in combination, a camera box; an objective lens; film guiding means behind said lens; a ground glass image screen; film feeding means; an arcuate front wall having an exposure aperture on the lens axis; a common support having an arcuate face coacting with said arcuate front wall and carrying said film guiding means, ground glass and film feeding means, said support being journalled within said camera box for turning movement in the arc of a circle about an axis perpendicular to the optical axis of said lens, to cause either a film in said film guiding means or said ground glass to register with said lens; a drive shaft for said film feeding means coincident with the axis of said support; and gearing operated by said shaft for driving said feeding means independently of the displacement of said film by said turning movement of said support, said film guiding means guiding the film past said lens in a path directed parallel to the axis about which said support is adapted to turn.

2. Motion picture camera comprising, in combination, an objective lens; film guiding means behind said lens; a ground glass; film feeding means; a common support for said film guiding means, ground glass and film feeding means, said support being mounted for swinging movement about an axis directed perpendicularly to the optical axis of said lens to cause either a film in said film guiding means or said ground glass to register with said lens; and driving means for said film feeding means, comprising a rotary shaft having its axis of rotation coincident with the axis about which said support is adapted to swing, whereby said shaft remains in driving connection with said feeding means independently of said swinging movement of said support, said film guiding means guiding the film past said lens in a path directed parallel to the axis about which said support is adapted to swing.

3. A motion picture camera comprising, in combination, a camera box; an objective lens; film guiding means behind said lens; a ground glass image screen; film feeding means; a frame having a concave arcuate wall with an exposure aperture on the lens axis; a common support, having a concave arcuate face, for said film guiding means, ground glass, and film feeding means, said support being journaled within said camera box for turning movement in an arc about an axis directed perpendicularly to the optical axis of said lens and common to the arc of said concave wall of said frame, to cause either a film in said film guiding means or said ground glass to register with said lens; a guide roll for the film on said frame; and driving means for said film feeding means, including a drive shaft coincident with the axis of said support for driving said feeding means independently of the displacement of said film by said turning movement of said support, said film guiding means guiding the film past said lens in a path directed parallel to the axis about which said support is adapted to turn.

FRIEDRICH BECK.